United States Patent
Malmbak et al.

(10) Patent No.: US 9,037,123 B2
(45) Date of Patent: May 19, 2015

(54) DETECTING INDOOR AND OUTDOOR USAGE OF A MOBILE DEVICE

(75) Inventors: Per Malmbak, Taunusstein (DE); Kelce Wilson, Murphy, TX (US); Young Ae Kim, Hallandale, FL (US)

(73) Assignee: BlackBerry Limited, Waterloo, Ontario (CA)

(*) Notice: Subject to any disclaimer, the term of this patent is extended or adjusted under 35 U.S.C. 154(b) by 129 days.

(21) Appl. No.: 13/331,930

(22) Filed: Dec. 20, 2011

(65) Prior Publication Data

US 2013/0157638 A1 Jun. 20, 2013

(51) Int. Cl.
| | |
|---|---|
| *H04W 8/22* | (2009.01) |
| *H04W 4/00* | (2009.01) |
| *H04W 4/04* | (2009.01) |
| *H04W 40/20* | (2009.01) |
| *H04L 12/707* | (2013.01) |

(52) U.S. Cl.
CPC .............. *H04W 4/001* (2013.01); *H04W 4/043* (2013.01); *H04W 40/20* (2013.01); *H04L 45/24* (2013.01)

(58) Field of Classification Search
CPC ....... H04W 4/02; H04W 16/18; H04W 48/08; H04W 48/16; H04W 52/0254; H04W 84/12; H04W 64/00
USPC .......................... 455/418–420, 414.1–414.4, 455/456.1–456.6
See application file for complete search history.

(56) References Cited

U.S. PATENT DOCUMENTS

| | | | |
|---|---|---|---|
| 2004/0176127 A1* | 9/2004 | Ballantyne et al. | 455/552.1 |
| 2004/0204026 A1* | 10/2004 | Steer et al. | 455/550.1 |
| 2004/0219930 A1* | 11/2004 | Lin | 455/456.1 |
| 2005/0195777 A1 | 9/2005 | Green | |
| 2006/0135067 A1* | 6/2006 | Dunko | 455/41.2 |
| 2008/0102957 A1 | 5/2008 | Burman et al. | |
| 2009/0170552 A1* | 7/2009 | Lin | 455/550.1 |
| 2010/0227581 A1 | 9/2010 | Cook et al. | |
| 2011/0195699 A1 | 8/2011 | Tadayon et al. | |
| 2012/0002044 A1* | 1/2012 | Li et al. | 348/142 |

OTHER PUBLICATIONS

Extended European Search Report for counterpart application 12196890.3-1856, pp. 1-6, dated Apr. 24, 2013.

* cited by examiner

*Primary Examiner* — San Htun
*Assistant Examiner* — Erica Navar
(74) *Attorney, Agent, or Firm* — Conley Rose, P.C.; J. Robert Brown, Jr.

(57) ABSTRACT

Mobile devices may be subject to different operational constraints in different geographies or circumstances. For example, power levels may be limited for transmissions in certain countries. The geographic position of a mobile device may be identified and used for determining the applicable local regulations. The local regulations may allow for different operational constraints depending on whether a device is located indoors or outdoors. Accordingly, a determination of indoor/outdoor state may be used to maximize device performance while also complying with appropriate regulations/circumstances.

16 Claims, 7 Drawing Sheets

US 9,037,123 B2

DETECTING INDOOR AND OUTDOOR USAGE OF A MOBILE DEVICE

BACKGROUND

Mobile devices may be subject to certain regulatory requirements in different countries. For example, there may be regulatory requirements that affect usage options for some radio frequency (RF) system channels, such as wireless fidelity (Wi-Fi) frequency bands, with respect to transmitted power levels and/or frequencies. The regulations may be different depending on whether a mobile device is operating indoors versus operating outdoors.

Current products may be configured with the most restrictive operational limitations implemented, and apply those restrictions in all cases, regardless of location. In this case, the mobile device may be unnecessarily under-performing when the device is operating in a more loosely-regulated environment. Alternatively, a device configured with the most loosely-constraining operational limitations may provide a user option for selecting the more restrictive limitations at the appropriate case. In this case, there is a risk that the user will fail to comply with the regulatory requirements, as a result of either being unaware or uncooperative.

DETAILED DESCRIPTION

The disclosed systems and methods identify a geographic location or position of a mobile device and determine whether the device is located indoors or outdoors in order to comply with governing regulations for that location. Since the regulations in certain countries may change depending on whether the mobile device is indoors or outdoors, that location determination may be used to maximize performance of the mobile device while still complying with applicable regulations. The position of a mobile device may be used for determining the appropriate regulations. For example, different countries may have different regulations regarding transmitted power levels or transmitted frequencies. Those regulations may also be different depending on whether a device is located indoors or outdoors. Accordingly, an identification of geographic position and determination of indoor/outdoor state may be used to maximize device performance while also complying with local regulations.

Figure 1:
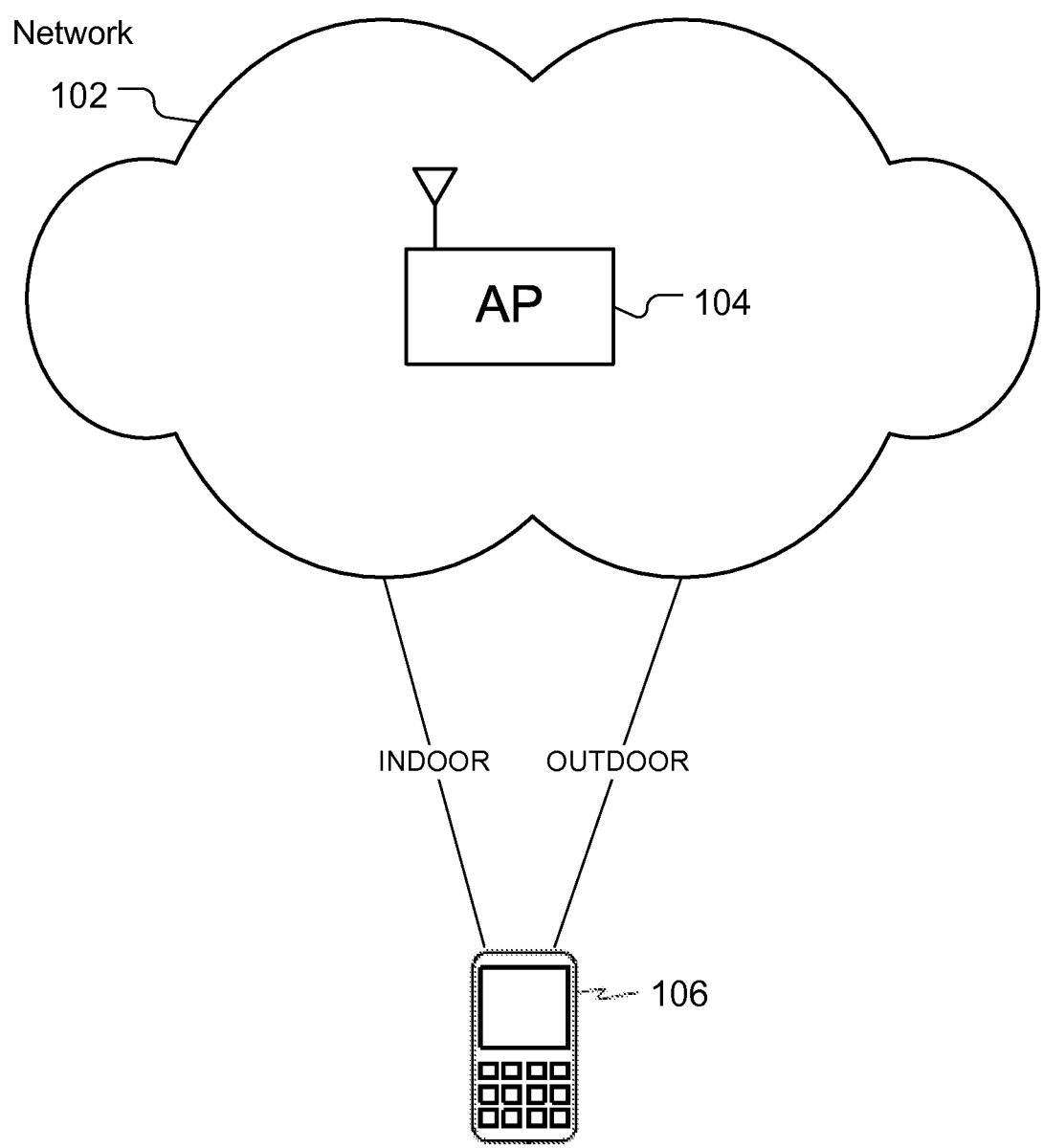
FIG. 1 illustrates a communication network.

FIG. 1 illustrates an exemplary communication network. An access point (AP) 104 in a network 102 that is available for connection broadcasts wireless signals to one or more devices, such as a mobile device 106. The mobile device 106 may also be referred to as a wireless terminal, terminal, device, or electronic device and is further described below with respect to FIG. 2. As shown, the mobile device 106 is in wireless range of the AP 104. The AP 104 is further described with respect to FIG. 3. Network information or other data may be communicated over the network 102. There may be a plurality of access points (e.g. AP 104) that provide access to respective access networks (e.g. network 102) for a plurality of wireless mobile devices (e.g. mobile device 106). Access points (e.g. AP 104) may be one or more of Wi-Fi access point, base station, Node B, and enhanced Node B. The provided network may be a Wi-Fi network, a cellular network such as GSM, EDGE, UMTS, LTE, cdmaOne, CDMA2000, WCDMA, a network that provides global positioning system (GPS) signals, or a wireless personal area network whose signals are carried via technologies like IrDA, Bluetooth, Wireless USB, ZigBee, etc. For simplicity, the connected network will be described as a Wi-Fi network, but the location state determination and regulation may be applicable for different types of networks and the operational constraints (regulated settings) may not only apply to Wi-Fi signals from the device, but also be applicable to other network communications or settings with the device. For example, other network includes a core network which provides various services to users or subscribers who are connected by one or more access networks.

The AP 104 and the mobile device 106 may include a network adapter or network interface card that facilitates connections to a wireless medium. AP 104 may provide a direct or indirect connection to the network 102, which may be either a private network, or a public network, such as the Internet. The network 102 may be a local network, such as a wireless local area network (WLAN), or may include other mesh, peer to peer, ad-hoc or Wi-Fi direct networks. The network 102 may be connected with an external network and may provide access for its mobile devices (e.g. the mobile device 106) to the external network. The external network may be a subscription service provider network (SSPN) owned or operated by data subscription service providers, Internet subscription service providers, media (e.g., audio/video) subscription service providers, wireless communications subscription service providers, or any combination thereof. The external network may include the Internet or may be connected to the Internet and may, for example, provide subscription-based Internet access to devices, such as the mobile device 106.

The network 102 may be a WLAN. Some WLAN locations or environments may be known as "hotspots" in reference to a location or environment that is within communication range of WLAN signals. WLAN locations or environments may include coffee shops, retail stores, home locations (e.g. homes and apartments), educational facilities, office environments, airports, public transportation stations and vehicles, hotels, etc. Such WLANs are often implemented as access networks that provide access to publicly accessible networks and may be associated with, or support access to, external networks (or WLAN-supported networks) owned and/or operated by subscription-based service providers. For example, an external network can be owned and/or operated by an Internet-access service provider or a telecommunications carrier/service provider that provides subscription-based service for a fee (e.g., a monthly fee). In some systems, a subscriber/user may subscribe to such a service can use wireless network access and/or Internet-access services based on such a subscription when the subscriber is in communication proximity of the WLAN with an appropriate mobile device. In some instances, different WLANs may provide access to different types of network information. For example, some WLANs may provide access to particular subscription service provider networks, and some WLANs may support roaming agreements to allow connections from mobile devices associated with different SSPs.

As described below with respect to FIGS. 4-7, the mobile device 106 may communicate with the network 102 from an outdoor state or an indoor state. The indoor/outdoor state of the mobile device 106 may be referred to as a location state and be used to determine certain settings or operational conditions for the mobile device 106 (e.g. power and frequency) to satisfy regulations of the current geographical position of the mobile device 106. In other words, the settings and communication between the mobile device 106 and the network 102 may be modified depending on whether the mobile device 106 is indoor or outdoor.

Figure 2:
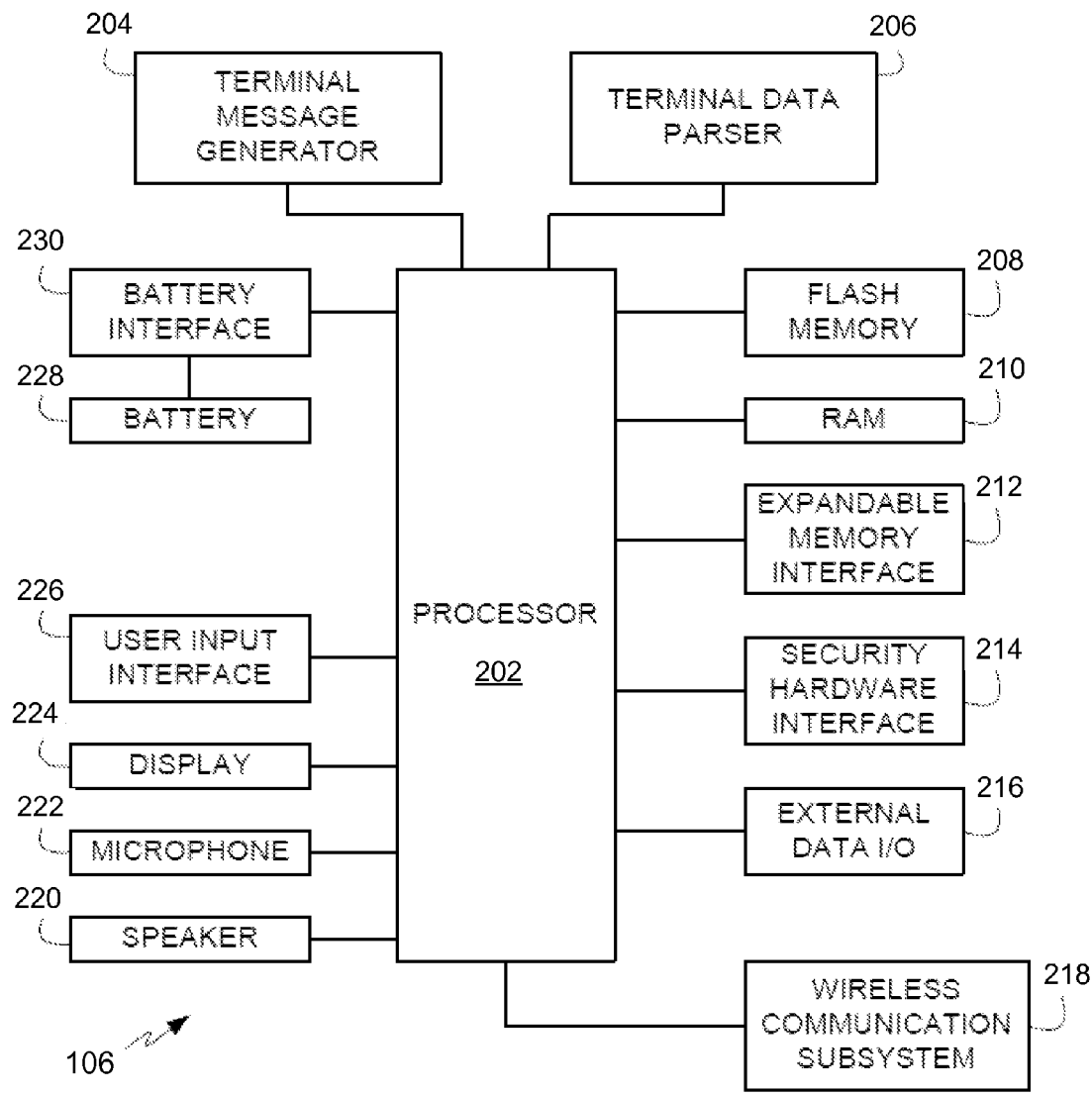
FIG. 2 illustrates a mobile device.

FIG. 2 illustrates a mobile device 106 as shown in FIG. 1. A plurality of mobile devices (e.g. the mobile device 106) may connect to a particular network. Such devices may also be referred to as terminals, wireless terminals, stations (STA), mobile stations (MS), user agents (UA) or user equipments (UE), and may also include mobile smart phones (e.g., a BlackBerry® smart phone), tablet (e.g., BlackBerry® Playbook), wireless personal digital assistants (PDA), machine to machine equipment, equipment within a smart grid (Smart-Grid), equipment within a mesh network (an ad-hoc or peer network), laptop/notebook/netbook computers with wireless adapters, etc. In one embodiment, the mobile device 106 may be a MS in Intelligent Transport Systems (ITS), and the indoor/outdoor state may be used for detecting tunnels, garages, maritime vessels, ferries, etc.

The mobile device 106 includes a processor 202 that may be used to control the overall operation of the mobile device 106. The processor 202 may be implemented using a controller, a general purpose processor, a digital signal processor, dedicated hardware, or any combination thereof. The processor 202 may include a central processing unit, a graphics processing unit, a digital signal processor or other type of processing device. The processor 202 may be a component in any one of a variety of systems. For example, the processor 202 may be part of a standard personal computer or a workstation. The processor 202 may be one or more general processors, digital signal processors, application specific integrated circuits, field programmable gate arrays, digital circuits, analog circuits, combinations thereof, or other now known or later developed devices for analyzing and processing data. The processor 202 may operate in conjunction with a software program, such as code generated manually (i.e., programmed).

The mobile device 106 also includes a terminal message generator 204 and a terminal data parser 206. The terminal message generator 204 may generate network information messages or data to be communicated over the network 102. The terminal data parser 206 may be used to obtain network information or data from memory (e.g., random access memory 210, etc.). For example, the terminal data parser 206 may obtain network information 120 that is cached in the mobile device 106 after receipt from a network.

In the illustrated embodiment, the terminal message generator 204 and the terminal data parser 206 are shown as separate from and connected to the processor 202. In alternative embodiments, the terminal message generator 204 and the terminal data parser 206 may be implemented in the processor 202 and/or in a wireless communication subsystem 218 (e.g., a wireless communication subsystem 218). The wireless communication subsystem 218 may support one or more communications for Wi-Fi, GSM, EDGE, UMTS, LTE, cdmaOne, CDMA2000, WCDMA, GPS, IrDA, Bluetooth, Wireless USB, ZigBee, etc. The terminal message generator 204 and the terminal data parser 206 may be the interface of the mobile device 106 for communicating with a network. The terminal message generator 204 and the terminal data parser 206 may be implemented using any combination of hardware, firmware, and/or software. For example, one or more integrated circuits, discrete semiconductor components, and/or passive electronic components may be used. The terminal message generator 204 and the terminal data parser 206, or parts thereof, may be implemented using one or more circuits, programmable processors, application specific integrated circuits, programmable logic devices, field programmable logic devices, etc.

The terminal message generator 204 and the terminal data parser 206, or parts thereof, may be implemented using instructions, code, and/or other software and/or firmware, etc. stored on a machine accessible medium and executable by, for example, a processor (e.g., the processor 202). The terminal message generator 204 or the terminal data parser 206 may be stored on or include a tangible storage medium or memory. For example, the terminal message generator 204 or the terminal data parser 206 may be implemented in software stored on a memory that is executable by the processor 202. Alternatively, the terminal message generator 204 and/or the terminal data parser 206 may be implemented in hardware with software functions. The memory for storing software associated with the terminal message generator 204 and/or the terminal data parser 206 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the memory may include the random access memory 210 for the processor 202, or may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store ad or user data. The memory is operable to store instructions executable by the processor 202.

The mobile device 106 may include a FLASH memory 208, a random access memory 210, and/or an expandable memory interface 212 coupled with the processor 202. The FLASH memory 208 may store computer readable instructions and/or data. In some embodiments, the FLASH memory 208 and/or the RAM 210 may store the network information from FIG. 1 and instructions for communicating that network information. The processor 202 may be coupled with the memory (e.g. the FLASH memory 208, or the RAM 210) for storing software instructions executable by the processor 202. The memory may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The functions, acts or tasks illustrated in the figures or described herein may be performed by the programmed processor 202 executing the instructions stored in the memory. The functions, acts or tasks are independent of the particular type of instruction set, storage media, processor or processing strategy and may be performed by software, hardware, integrated circuits, firm-ware, micro-code and the like, operating alone or in combination.

Likewise, processing strategies may include multiprocessing, multitasking, parallel processing and the like.

The mobile device 106 may include a security hardware interface 214 to receive a SIM card from a wireless service provider. A SIM card may be used authentication of the mobile device 106 for establishing a connection with a network and may be used for identifying a geographic position based on received information from the network. The mobile device 106 may be provided with an external data I/O interface 216. The external data I/O interface 216 may be used by a user to transfer information to the mobile device 106 through a wired medium.

The mobile device 106 may include wireless communication subsystem 218 to enable wireless communications with access points (e.g., the access point 104 of FIG. 1). Although not shown, the mobile device 106 may also have a long-range communication subsystem to receive messages from, and send messages to, a cellular wireless network. In the illustrated examples described herein, the wireless communication subsystem 218 may be configured in accordance with the IEEE® 802.11 standard. In other example implementations, the wireless communication subsystem 218 may be implemented using a BLUETOOTH® radio, a ZIGBEE® device, a wireless USB device, an ultra-wideband radio, a Near Field Communications ("NFC") device, or a Radio Frequency Identifier ("RFID") device. In another embodiment, an MS within an ITS may detect locations in tunnels, garages, maritime vessels, ferries, etc.

The mobile device 106 may include a user interface for communicating from the device. The user interface may be separate component or it may include a speaker 220, a microphone 222, a display 224, and a user input interface 226. The display 224 may be a liquid crystal display, an organic light emitting diode, a flat panel display, a solid state display, a cathode ray tube, a projector, a printer or other now known or later developed display device for outputting determined information. The user input interface 226 may include alphanumeric keyboard and/or telephone-type keypad, a multi-direction actuator or roller wheel with dynamic button pressing capability, a touch panel, etc. For example, regulations and settings (e.g. operational constraints) corresponding to those regulations may be communicated with or without each of the user interfaces described herein. Likewise, the user input interface 226 may provide a user with an option for selecting appropriate settings for the device depending on the location and indoor/outdoor state. The speaker, 220, the microphone 222, the display 224, the user input interface 226, and/or any combination thereof may be omitted in alternative embodiments. In one embodiment, the mobile device 106 is a battery-powered device and includes a battery 228 and a battery interface 230.

Figure 3:
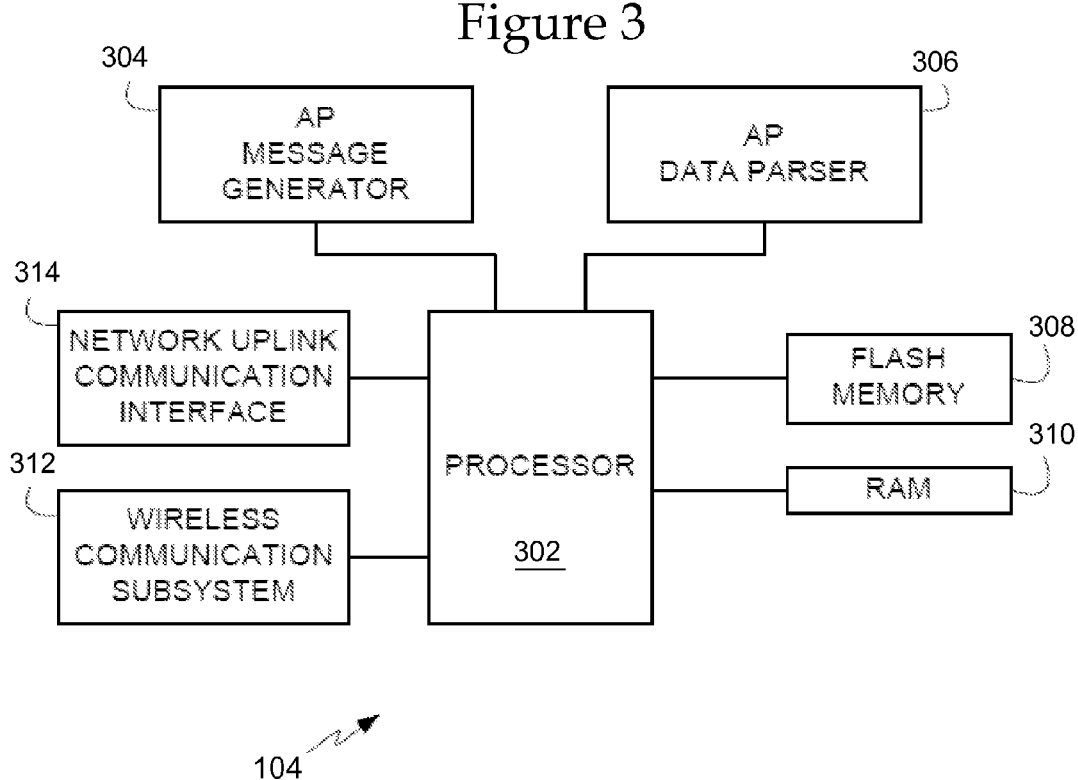
FIG. 3 illustrates an access point.

FIG. 3 illustrates an access point AP 104. The access point shown in FIG. 3 is AP 104 from FIG. 1, but may also be illustrative of other access points that provide networks accessible by mobile devices. AP 104 includes a processor 302 to perform operations of the AP 104. The processor 302 may be similar to the processor 202 described above.

The AP 104 includes an access point message generator 304 to generate network information communications for providing data to a terminal, and an access point data parser 306 for obtaining network information communications and data from the mobile device 106 and/or an external network. The access point message generator 304 may be similar to the terminal message generator 204 of FIG. 2, and the access point data parser 306 may be similar to the terminal data parser 206 of FIG. 2. The access point message generator 304 and the access point data parser 306 may be a communication interface for the network provided by the AP 104. As with the terminal message generator 204 and the terminal data parser 206 of FIG. 2, the access point message generator 304 and the access point data parser 306 may be implemented in software stored on a memory that is executable by the processor 302 or may be implemented in hardware with software functions executed by the processor 302. Alternatively, the access point message generator 304 and the access point data parser 306 may be implemented in a wireless communication subsystem (e.g., a wireless communication subsystem 312) using any combination of hardware, firmware, and/or software including instructions stored on a tangible computer readable medium and/or a non-transitory computer readable medium. The wireless communication subsystem 312 may support one or more communications for Wi-Fi, GSM, EDGE, UMTS, LTE, cdmaOne, CDMA2000, WCDMA, GPS, IrDA, Bluetooth, Wireless USB, ZigBee, etc.

The AP 104 may also include a FLASH memory 308 and a RAM 310, both of which are coupled to the processor 302. The FLASH memory 308 and/or the random access memory ("RAM") 310 may be configured to store network information or data that is communicated over the network 102. The RAM 310 may also be used to generate messages for communication with the mobile device 106 and/or an external network. The RAM 310 may also store received messages communicated by the mobile device 106 and/or an external network.

To communicate with mobile devices (e.g. the mobile device 106), the AP 104 may include a wireless communication subsystem 312, which may be similar to the wireless communication subsystem 218 of the mobile device 106 illustrated in FIG. 2. To communicate with a network or external network, the AP 104 may include a network uplink communication interface 314.

Figure 4:
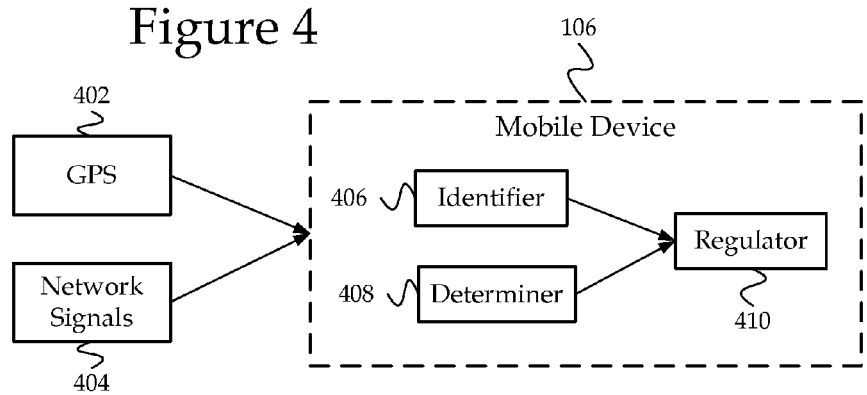
FIG. 4 illustrates an embodiment of the mobile device.

FIG. 4 illustrates an embodiment of the mobile device 106. The mobile device 106 may receive global positioning satellite (GPS) signals 402 and network signals 404. The GPS signals 402 may be signals from any satellite based navigation system like Gallieo, Glonass or Beidou. The GPS signals 402 may also include an Assisted GPS (A-GPS) signal. The network signals may include any communications or data from the network 102 such as cellular or Wi-Fi communications via the AP 104. The mobile device 106 may utilize the received signals for modifying or adjusting its settings or operational constraints to comply with local regulations.

An identifier 406 may identify the geographic position or location of the mobile device 106. In one embodiment, the identifier 406 utilizes a country code or other identification from the base station that is providing the cellular signal to the device. In one example, a mobile country code (MCC) may be used to identify the geographic location, such as a country. The MCC may be part of the International Mobile Subscriber Identity (IMSI) number for identifying a subscriber. The MCC may also be part of the Public Land Mobile Network (PLMN) identity for identifying a network which the mobile device attempts to register. The MCC may be stored on a memory in the mobile device, or a removable card such as Subscriber Identity Module (SIM), Universal Subscriber Identity Module (USIM) or Universal Integrated Circuit Card (UICC) card which can be inserted into the mobile device. The MCC may be provisioned to a mobile device or a removable card by its PLMN operator which has subscription of service for the mobile device or the removable card using technologies like over-the-air (OTA), device management (DM), etc. The MCC may be provisioned from the network to a mobile device in order to provide regulatory jurisdiction information. The MCC may be provisioned from the network to a mobile device so that the mobile device attempts to register to the network and, if registered, determines which regulatory jurisdiction policy stored on the mobile device should be enforced. Alternatively, the parameter of the country may be set up in a Wi-Fi Access Point (AP) for a WLAN when Wi-Fi AP is shipped to certain countries from manufacturers or when it is stocked in stores of certain countries. Alternatively, the GPS signal 402 may be used to identify the geographic position of the mobile device. The geographic position to be identified may be a country to account for differing regulations between countries. In other words, the exact geographic position may be unnecessary as long as the country is known. Alternatively, the geographic position may be a state or city to account for differing regulations between states or cities. The regulations at any given geographic position may be referred to as local regulations.

Once a geographic position is identified by the identifier 406, the appropriate regulations for that geographic location are obtained or retrieved. There may be a separate component (e.g. an obtainer or a retriever) that utilizes the geographic position to establish the appropriate regulations for the current country/state/city of the device. When a mobile device registers to a mobile operator network then the mobile device may know in which country it has registered based on the MCC value. A look-up table (which may be remotely updated over the air with a push service) may list the applicable regulations, indexed by MCC or using an equivalent look-up capability. In another embodiment, applicable regulation policies are embedded in a memory of a mobile device and proper regulation policy is polled out by a mobile device based on the MCC value indicating in which country the mobile device has currently registered.

The determiner 408 makes a determination as to a current state of the mobile device 106. The determiner 408 may also be referred to as a detector that detects the current state of the device, which is also referred to as a location state or environment state. In one embodiment, the state may reflect the conditions or environment in which the mobile device 106 is located. The identified and obtained or polled regulations may differ depending on the environmental state of the mobile device 106. For example, the allowed wireless radio frequency (RF) power transmission levels may be different depending on the environmental state for the mobile device 106. A mobile device 106 outdoor may be allowed increased RF power, while a mobile device 106 indoor may be regulated to have less RF power. In another embodiment, a mobile device 106 indoor may be allowed increased RF power, while a mobile device 106 outdoor may be regulated to have less RF power. In addition to environmental state and indoor/outdoor state, the determiner 408 may determine other conditions of the mobile device 106 or other conditions around the mobile device 106 that may result in different regulations for that particular geographic location. As described herein as one example, the condition that is determined or detected is whether the mobile device 106 is the location state of whether a device is in an indoor state or an outdoor state. The determination of an indoor/outdoor state may be referred to as a location state or a condition state and is further described below with respect to FIGS. 5-7.

The regulator 410 receives the appropriate regulations (and/or the geographic position) from a network or from a memory of the mobile device, as well as the indoor/outdoor state. The settings or operational constraints of the mobile device 106 may be modified or adjusted to comply with the appropriate regulations in view of the indoor/outdoor state. For example, the power transmission level may be modified or adjusted depending on the indoor/outdoor state and the particular requirements for that country. In the case of Wi-Fi, there may be power or frequency limits depending on the channel of the signal. An alternative operational constraint may be to limit the frequency bands to the lower four Wi-Fi channels in a Wi-Fi signal. In one embodiment, different countries have different power transmission regulations that are also different depending on whether the device is indoor or outdoor. The regulator 410 sets the power transmission level of the mobile device 106 to a maximum allowed value for that country and depending on whether the mobile device 106 is indoors or outdoors.

In an alternative embodiment, this analysis may also apply to cognitive radio. A cognitive radio may be another example of a mobile device 106 that may adapt to the environment/circumstances. For example, in an area where different services/systems are sharing the same frequency band (in order to improve frequency utilization). In a cellular system where conventional base station operation may be used outdoor, a mobile device that is moving indoor buildings may look for a femtocell access point. Femtocell may also refer to another technology (frequency band, modulation scheme, power level etc.). If found, it may switch and unload the conventional outdoor system, the reduced RF power of the mobile device in the in-building environment allows the mobile to operate in the same band without interfering with the conventional infrastructure. The detector may determine when a mobile device should be looking for a femtocell.

Figure 5:
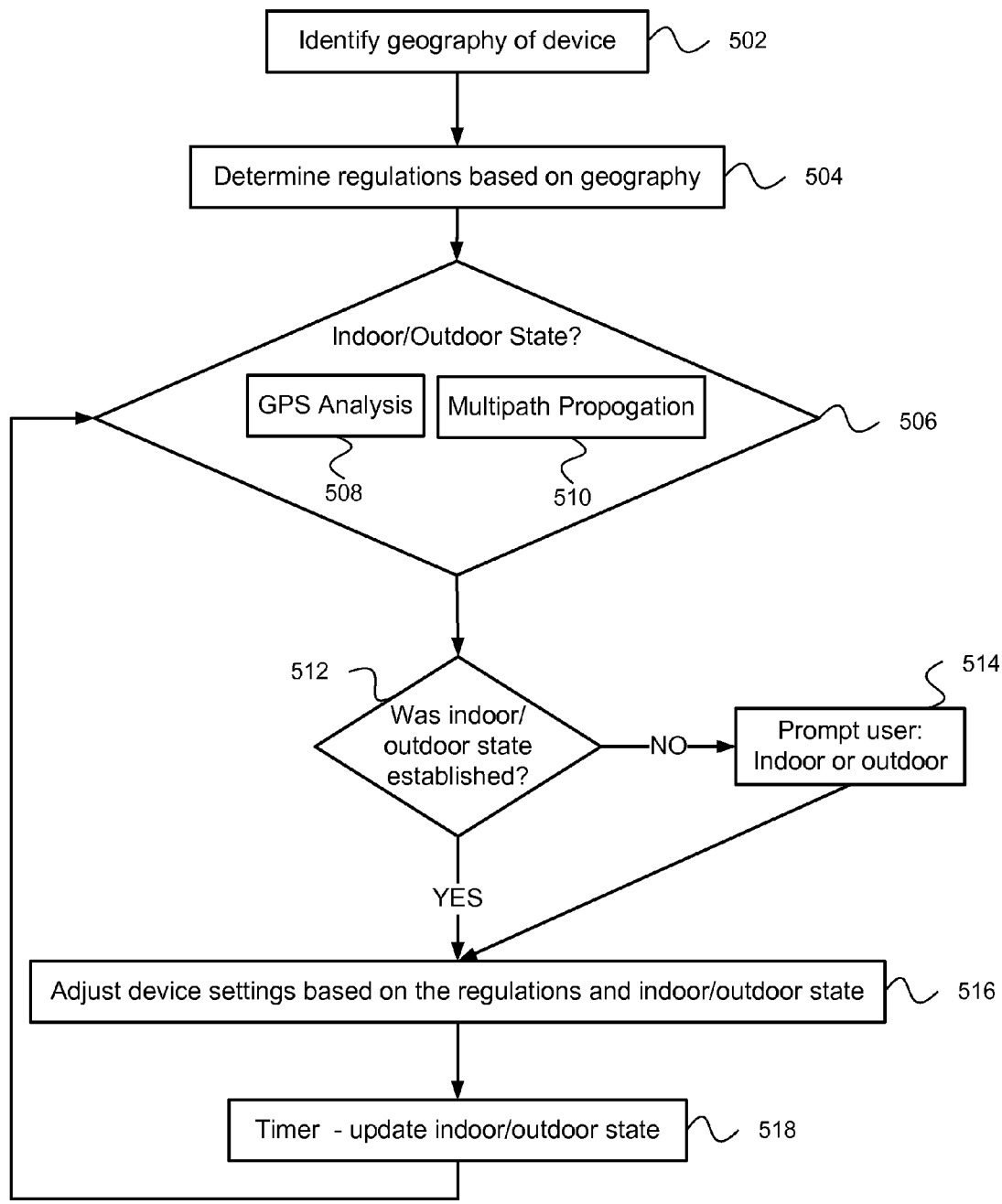
FIG. 5 illustrates location state detection and device regulation.

FIG. 5 illustrates location state detection and device regulation. In block 502, the geographic position (e.g. country) of a device (e.g. mobile device 106) is identified. As discussed, there may be an identifier that identifies geography based on a country code or other identification in a received signal (e.g. network signals 404) or based on a GPS signal (e.g. GPS 402). The geographic position may be a country or state or other area (e.g. metropolitan) with known regulations for mobile devices. In block 504, the regulations for that geographic position are determined. There may be a lookup table that includes the regulations for the current geographic position.

With the geographic position and corresponding regulations determined, the environmental or location state of the device is determined in block 506. In one embodiment, the location state is determined based on a GPS analysis in block 508. In an alternative embodiment, the location state is determined based on multipath propagation in block 510. GPS analysis in block 508 is discussed below in FIG. 6 and multipath propagation in block 510 is discussed below in FIG. 7.

When the location state cannot be established in block 512, the user may be prompted for verification in block 514. In other words, when both GPS analysis and multipath propagation fail to provide a location state or at least fail to provide a location state with a certain confidence, then the user may be asked to either provide or confirm the location state. For example, when the location state is determined to be outdoor based on either GPS analysis or multipath propagation, but the determination is uncertain, the user may be prompted to confirm that the device is outdoor.

When the location state is known from block 512 or verified by the user in block 514, the device operational settings may be set based on the identified regulations for the particular location state. As discussed above, there may be determiner that determines the location state and a regulator that sets the device to comply with the regulations. The regulator 410 may change the device's operational settings to or adjust proper regulatory operational settings on the device in block 516. In block 518, there may be a timer that rechecks for the location state periodically. The timer may be set to check the location state every ten seconds, every minute, every ten minutes, or some other amount of time. In block 518, when the timer is triggered, the location state is again determined in block 506.

Figure 6:
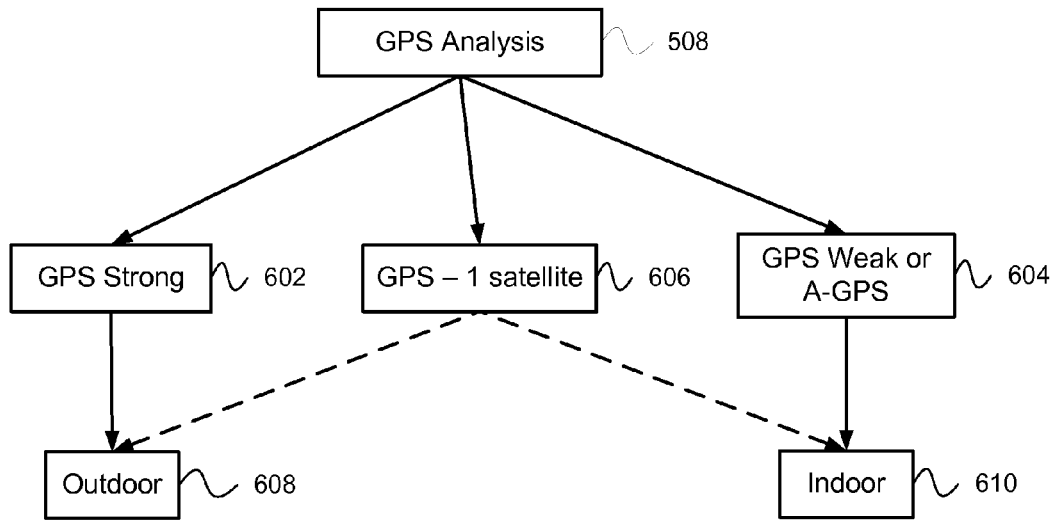
FIG. 6 illustrates location state detection with GPS.
Figure 8:
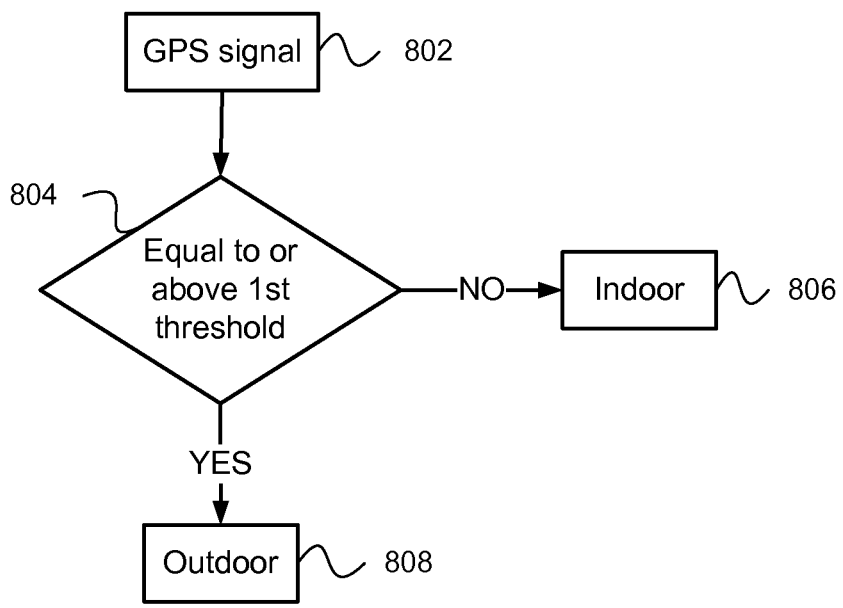
FIG. 8 illustrates location state detection with a GPS signal.
Figure 9:
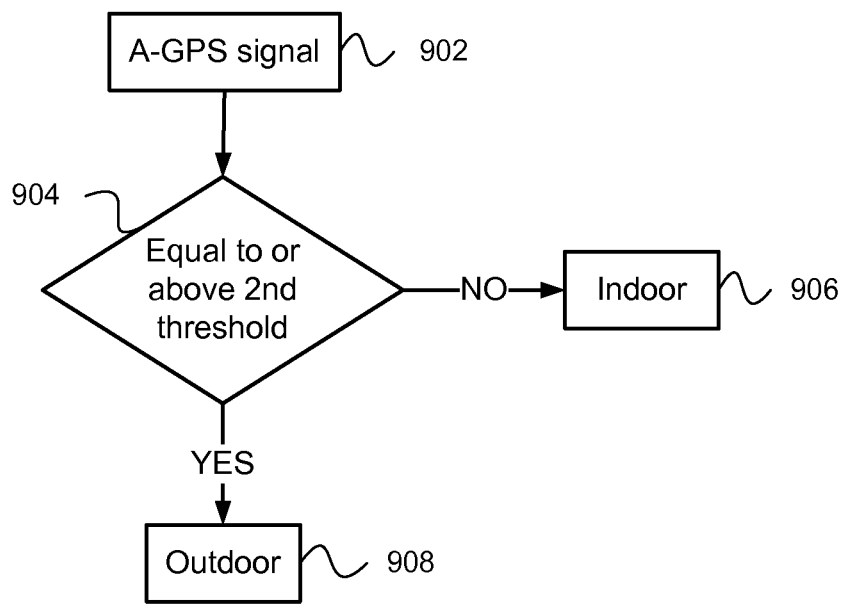
FIG. 9 illustrates location state detection with an assisted GPS signal.
Figure 10:
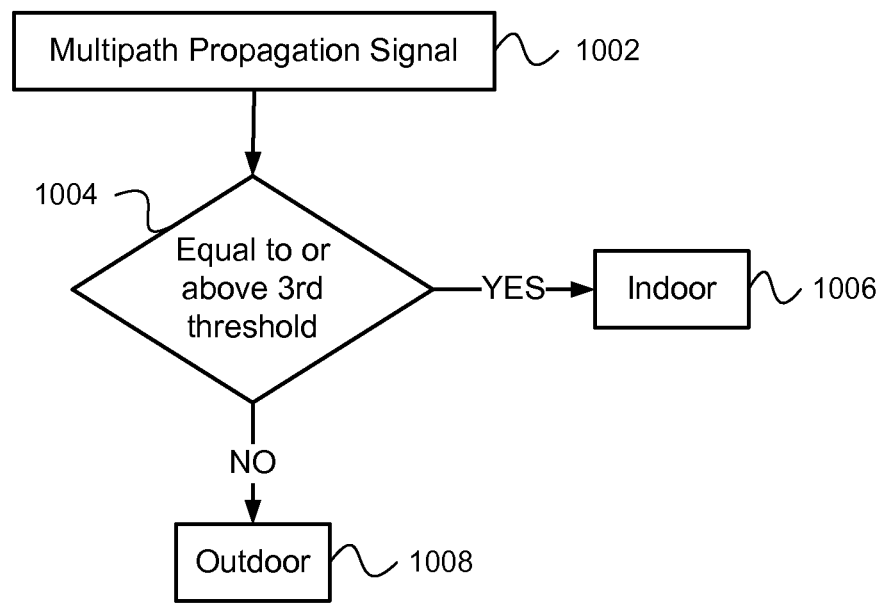
FIG. 10 illustrates location state detection with a multipath propagation signal.

FIG. 6 illustrates location state detection with global positioning satellite (GPS). FIG. 6 illustrates the GPS analysis in block 508 of FIG. 5. The strength of a GPS signal 402 may be used to determine whether a mobile device is indoors or outdoors. A strong GPS signal 602 is indicative of being outdoor 608. A weak GPS signal 604 is indicative of being indoor 610. In one embodiment, a GPS signal may usually include signals from three or more satellites which would indicate a strong signal in an outdoor state 608. If the signal is from no satellites or a few satellites, it may indicate a weak signal 604, and the location state is considered to be indoor 610. In another embodiment, when a mobile device operates in Assisted GPS (A-GPS) mode the location state may be considered to be indoor 610. In A-GPS, network operator deploys an A-GPS server which downloads orbital information like ephemeris and almanac directly from one or more satellites and stores the orbital information in the database. The mobile device connects to the A-GPS server via an access network (e.g. GSM, EDGE, UMTS, LTE, cdmaOne, CDMA2000, WCDMA, Wi-Fi) and downloads the orbital information via the access network. Accordingly, as described herein, the indoor/outdoor state may be determined by the GPS signal strength or A-GPS mode operation. FIGS. 8-10 illustrate alternative embodiments for determining a location state based on a GPS signal, an A-GPS signal, and a communications signal, respectively.

Determining indoor/outdoor state based on GPS signal strength or A-GPS mode operation may be quicker and more efficient than determining whether a device's GPS positional coordinates corresponds to an indoor location, although that is a possible way to determine location state. Even when the GPS coordinates may not be known due to a weak signal or too few satellites, the location state may still be determined based on signal strength.

When the GPS signal is detected from one satellite 606, the location state may be uncertain as to whether the device is outdoor or indoor. In one embodiment, a GPS signal from one satellite 606 may be considered an outdoor state, but with less certainty than a GPS signal with two or more satellites. In other words, a GPS signal from one satellite generally represents a weaker signal, and may be indicative of uncertainty regarding the location state (e.g. block 514 of FIG. 5).

Figure 7:
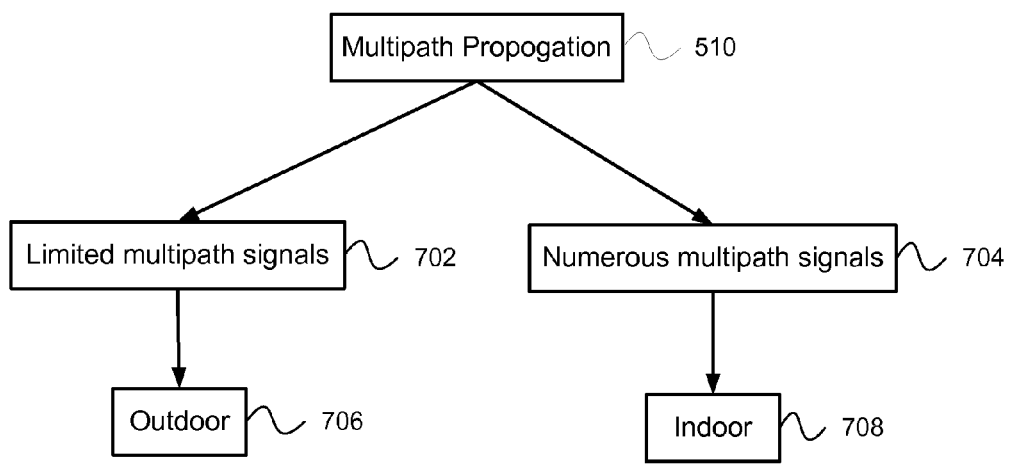
FIG. 7 illustrates location state detection with multipath propagation.

FIG. 7 illustrates location state detection with multipath propagation. FIG. 7 illustrates the multipath propagation in block 510 of FIG. 5. Multipath propagation 510 may be an alternative method to the GPS analysis 508 for determining location state. In one embodiment, when the GPS analysis 508 is uncertain regarding the location state, the multipath propagation 510 may be used. Multipath propagation may analyze the network signals 404 to determine whether the paths of those signals have bounced off multiple sources. A limited number of multipath signals 702 may be indicative of a location state that is outdoor 706. Numerous multipath signals 704 may be indicative of a location state that is indoor 708.

Multipath propagation is based on a received signal bouncing off multiple surfaces and received from each of those surfaces at slightly different times. The walls, ceiling, floor, and other objects that are indoors result in increased multipath propagation indoor rather than outdoor. Conversely, when the device is outdoor, there may be a bounced signal, but generally the number of multipath signals is reduced. The network signals 404 that are used for detecting this multipath propagation may include Wi-Fi, GPS, cellular, or any other communication signals received by the device.

In other words, when a mobile device and its transmitter are both outdoors, the mobile device may likely receive at least two signals: a direct signal and a ground-bounce signal. The ground-bounce signal may take a path from the transmitter antenna to the ground, reflect from the ground, and then propagate to the mobile device antenna. Other reflections are possible, but are likely to be limited in number. Conversely, multi-path routes indoors may include multiple walls and the ceiling. Multi-path signals may contain more energy and carry a larger number of time-delayed signal replicas for the indoor scenario rather than the outdoor scenario. Multipath may be suppressed to reduce the communication channel's bit error rate (BER), but may be sensed prior to the suppression. A correlation circuit may be used to estimate the number of time-delayed signal replicas. The energy in a multipath signal may vary widely, based on whether reflections from surfaces are specular or diffuse, whether different signals interfere constructively or destructively, and whether any reflecting surfaces cause focusing.

Referring back to FIG. 5, the location state determination in block 506 may include a weighted algorithm for making the determination. The specific weights to apply to each sensed indicia (e.g. GPS analysis 508 and multipath propagation 510) may be determined empirically, by collecting measurements in known conditions, and calculating weighting coefficients so that the combined calculation meets or fails a requirement, with some degree of confidence, according to the indoor/outdoor conditions. The user may be prompted to make a determination, if the sensed indicia do not provide sufficiently reliable determinations.

In alternative embodiments, the GPS analysis 508 may be performed first and the multipath propagation 510 is performed when the GPS analysis 508 is inconclusive. There may be a certainty level for the certainty needed for the GPS analysis. The certainty level may be referred to as a threshold. That certainty level may be based on the number of satellites detected. For example, two or more satellites may be outdoors and no satellite is indoors while one satellite may be uncertain to determine indoor or outdoor state. In other words, detection of one satellite may suggest an outdoor state, but is less certain than detecting two or more satellites. Alternatively, both the GPS analysis 508 and the multipath propagation 510 may be performed and the output weighted based on certainty. For example, when three or more satellites are detected, the GPS analysis 508 may be given significant weight for an outdoor state. Likewise, when no satellites are detected, the GPS analysis 508 may be given significant weight for an indoor state. Conversely, when two satellites are detected for the GPS analysis 508, it may be given smaller weight as the deciding factor and the multipath propagation 510 may be weighted more heavily.

FIG. 8 illustrates location state detection with a threshold for a GPS signal 802 wherein the threshold is called a first threshold. The threshold determination may be another example of the GPS analysis 508. In one embodiment, the GPS signal 802 may be the GPS signal 402 described with respect to FIG. 4. The GPS signal 802 is received and the GPS signal 802 is compared with the first threshold 804. The first threshold value may be a measurement of GPS signal strength. When the GPS signal 802 is below the first threshold, the mobile device is determined to be in an indoor state 806. When the GPS signal 802 is equal to or above the first threshold, the mobile device is determined to be in an outdoor state 808.

FIG. 9 illustrates location state detection with a threshold for an A-GPS signal 902 wherein the threshold is called a second threshold. The threshold determination may be another example of the GPS analysis 508. In one embodiment, the GPS signal 402 described with respect to FIG. 4 may also be an A-GPS signal, such as the A-GPS signal 902. The A-GPS signal 902 is received and the A-GPS signal 902 is compared with the second threshold 904. The second threshold value may be a measurement of A-GPS signal strength. When the A-GPS signal 902 is below the second threshold, the mobile device is determined to be in an indoor state 906. When the A-GPS signal 902 is equal to or above the second threshold, the mobile device is determined to be in an outdoor state 908.

FIG. 10 illustrates location state detection with a threshold for a multipath propagation signal 1002 wherein the threshold is called a third threshold. The threshold determination may be another example of the multipath propagation 510. In one embodiment, the multipath propagation signal 1002 may be one or more of network signals 404 described with respect to FIG. 4. The multipath propagation signal 1002 is received and is compared with the third threshold 1004. The third threshold value may be a measurement of communications signal strength for multipath propagation. When the multipath propagation 1002 is below the third threshold, the mobile device is determined to be in an outdoor state 1008. When the multipath propagation signal 1002 is equal to or above the third threshold, the mobile device is determined to be in an indoor state 1006.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method for regulating a device comprising:
 identifying a geographic position of the device;
 obtaining regulations related to the identified geographic position;
 determining a location state of the device, wherein the device detects location state information utilizing one or more of:
  analysis of characteristics of a signal received by the device from another device;
  analysis of characteristics of multipath signals received by the device from the another device; or
  use of assisted global positioning system (A-GPS) mode of operation by the device;
 receiving one or more of a global positioning system (GPS) signal, an assisted GPS (A-GPS) signal, or a communications signal from the another device as a multipath propagation signal;
 wherein:
  the determining the location state further comprises determining the location state based on a strength of the received one or more of the GPS signal, the A-GPS signal, or the multipath propagation signal from the another device;
  the determining the location state further comprises:
   comparing a threshold value to the strength of the received signal, wherein the threshold value is a first threshold value for the GPS signal, a second threshold value for the A-GPS signal, and a third threshold value for the multipath propagation signal from the another device; and determining the location state of the device based on the comparison; and the location state for the GPS signal and the A-GPS signal is an indoor state when the strength of the received signal is less than the first and the second threshold values respectively, and an outdoor state when the strength of the received signal is equal to or greater than the first and second threshold value respectively, and the location state for the multipath propagation signal from the another device is an indoor state when the strength of the received signal is equal to or greater than the third threshold value, and an outdoor state when the strength of the received signal is less than the third threshold value; or wherein:

the determining the location state further comprises determining a location state of the device based on the number of the detected multipath propagation signals from the another device, wherein the location state is an indoor state when the number is greater than two and an outdoor state when the number is equal to or fewer than two; and adjusting operational constraints of the device based on the obtained regulations and the determined location state of the device which is based on, at least, the location state information detected by the device.

2. The method of claim 1 wherein the obtaining comprises obtaining regulations related to the identified geographic position from a network or from a memory on the device.

3. The method of claim 1 wherein the location state comprises an indoor state and an outdoor state.

4. The method of claim 1 wherein the location state is an indoor state when an A-GPS signal is detected.

5. The method of claim 1 wherein the operational constraints comprise a power transmission level or a frequency of transmission from the device.

6. The method of claim 1 wherein information on which network the device has registered to includes a country code that identifies the country for the geographical position.

7. The method of claim 6 wherein the identifying step comprises registering on a network and identifying a geographic position of the device, wherein the geographic position of the device is based on information on which network the device has registered to.

8. A device comprising:

a processor that communicates through a wireless communication subsystem adapted to:

identify a geographic position of the device;

obtain regulations related to the identified geographic position;

determine a location state for the device, wherein the device detects location state information utilizing one or more of:

analysis of characteristics of a signal received by the device from another device;

analysis of characteristics of multipath signals received by the device from the another device; or use of assisted global positioning satellite (A-GPS) mode of operation by the device;

receive one or more of a global positioning satellite (GPS) signal, an assisted GPS (A-GPS) signal, or a communications signal as a multipath propagation signal from the another device;

wherein:

the processor is further adapted to determine a location state of the device based on strength of the received one or more of the GPS signal, the A-GPS signal, or the multipath propagation signal from the another device;

the processor is further adapted to:

compare a threshold value to the strength of the received signal, wherein the threshold value is a first threshold value for the GPS signal, a second threshold value for the A-GPS signal, and a third threshold value for the multipath propagation signal from the another device; and determine the location state of the device based on the comparison; and the location state for the GPS signal and the A-GPS signal is an indoor state when the strength of the received signal is less than the first and the second threshold values respectively, and an outdoor state when the strength of the received signal is equal to or greater than the first and second threshold value respectively, and the location state for the multipath propagation signal from the another device is an indoor state when the strength of the received signal is equal to or greater than the third threshold value, and an outdoor state when the strength of the received signal is less than the third threshold value; or wherein: the processor is adapted to determine a location state of the device based on the number of the detected multipath propagation signals from the another device, wherein the location state is an indoor state when the number is greater than two, and an outdoor state when the number is equal to or fewer than two; and adjust operation constraints of the device based on the obtained regulations and the determined location state of the device which is based on, at least, the location state information detected by the device.

9. The device of claim 8 wherein the location state comprises an indoor state and an outdoor state.

10. The device of claim 8 wherein the location state is an indoor state when an A-GPS signal is detected.

11. The device of claim 8 wherein the processor is adapted to register on a network and identify a geographic position of the device, wherein the geographic position of the device is based on a mobile country code on a network that the device has registered to.

12. The device of claim 8 wherein the operational constraints comprises a power transmission level or a frequency of transmission from the device.

13. The device of claim 8 wherein the device further includes a wireless communications subsystem.

14. A mobile device comprising:

a processor that communicates through a wireless communication subsystem;

an identifier that identifies a geographic position of the mobile device and identifies regulations related to the identified geographic position;

a determiner that determines a location state for the mobile device based in part on analysis by the device of one or more of a global positioning system (GPS) signal, an assisted GPS (A-GPS) signal, or a communications signal received as a multipath propagation signal from another device utilizing one or more of:

analysis of characteristics of a signal received by the device from the another device;

analysis of characteristics of multipath signals received by the device from the another device; or use of assisted global positioning satellite (A-GPS) mode of operation by the device;

receive one or more of a global positioning satellite (GPS) signal, an assisted GPS (A-GPS) signal, or a communications signal as a multipath propagation signal from the another device;

wherein:

the processor is further adapted to determine a location state of the device based on strength of the received one or more of the GPS signal, the A-GPS signal, or the multipath propagation signal from the another device;

the processor is further adapted to:

compare a threshold value to the strength of the received signal, wherein the threshold value is a first threshold value for the GPS signal, a second threshold value for the A-GPS signal, and a third threshold value for the multipath propagation signal from the another device; and determine the location state of the device based on the comparison; and the location state for the GPS signal and the A-GPS signal is an indoor state when the strength of the received signal is less than the first and the second threshold values respectively, and an outdoor state when the strength of the received signal is equal to or greater than the first and second threshold value respectively, and the location state for the multipath propagation signal from the another device is an indoor state when the strength of the received signal is equal to or greater than the third threshold value, and an outdoor state when the strength of the received signal is less than the third threshold value;

or wherein:

the processor is adapted to determine a location state of the device based on the number of the detected multipath propagation signals from the another device, wherein the location state is an indoor state when the number is greater than two, and an outdoor state when the number is equal to or fewer than two; and a regulator that adjusts the mobile device based on the identified regulations and the determined location state.

15. The mobile device of claim 14 wherein the location state comprises an indoor state and an outdoor state.

16. The method of claim 1 wherein the location state is associated with a level of confidence and in instances when the location state does not associate with a certain degree of confidence, a user is prompted to provide or confirm the location state.

* * * * *